US006990810B2

(12) United States Patent
Pellizzari et al.

(10) Patent No.: US 6,990,810 B2
(45) Date of Patent: Jan. 31, 2006

(54) THREADED SEALING FLANGE FOR USE IN AN EXTERNAL COMBUSTION ENGINE AND METHOD OF SEALING A PRESSURE VESSEL

(76) Inventors: Roberto O. Pellizzari, 95 Raddin Rd., Groton, MA (US) 01450; Laurence B. Penswick, 121 Carefree Dr., Stevenson, WA (US) 96848

( * ) Notice: Subject to any disclaimer, the term of this patent is extended or adjusted under 35 U.S.C. 154(b) by 0 days.

(21) Appl. No.: 10/943,545

(22) Filed: Sep. 17, 2004

(65) Prior Publication Data

US 2005/0076638 A1 Apr. 14, 2005

Related U.S. Application Data

(60) Provisional application No. 60/504,090, filed on Sep. 19, 2003.

(51) Int. Cl.

| | |
|---|---|
| ***F01B 29/10*** | (2006.01) |
| ***F02G 1/04*** | (2006.01) |
| ***F25B 9/00*** | (2006.01) |
| ***F16H 21/22*** | (2006.01) |
| ***F16J 15/50*** | (2006.01) |

(52) U.S. Cl. ............................ 60/517; 60/520; 60/526

(58) Field of Classification Search ................. 60/517, 60/520, 526

See application file for complete search history.

(56) References Cited

U.S. PATENT DOCUMENTS

| | | | | |
|---|---|---|---|---|
| 3,766,568 | A | 10/1973 | Lavigne | 60/526 |
| 4,779,421 | A | 10/1988 | Fellows | 60/525 |
| 5,485,726 | A * | 1/1996 | Shin et al. | 60/519 |
| 5,715,683 | A * | 2/1998 | Hofbauer et al. | 60/517 |
| 5,755,100 | A | 5/1998 | Lamos | 60/521 |
| 6,141,962 | A | 11/2000 | Storen et al. | 60/520 |
| 6,389,811 | B2 * | 5/2002 | Urasawa et al. | 60/517 |
| 6,796,122 | B2 * | 9/2004 | Scranton | 60/517 |

* cited by examiner

*Primary Examiner*—Sheldon J Richter
(74) *Attorney, Agent, or Firm*—Roberts Mlotkowski & Hobbes

(57) ABSTRACT

A pressure vessel for containing a mechanical device operable to convert heat to mechanical or electrical power, comprising: a high temperature section, the high temperature section having a first end and an open second end, a sealing flange, the sealing flange having a first end and a second threaded end, the first end bonded to the open second end of the high temperature section, and a low temperature section having an open threaded first end, the open first end in sealing engagement with the second threaded end of the sealing flange. Also provided are a Stirling engine and a method of hermetically sealing a pressure vessel of a Stirling engine.

8 Claims, 3 Drawing Sheets

THREADED SEALING FLANGE FOR USE IN AN EXTERNAL COMBUSTION ENGINE AND METHOD OF SEALING A PRESSURE VESSEL

RELATED APPLICATIONS

This patent application claims priority to Provisional Application Ser. No. 60/504,090, filed on Sep. 19, 2003, the contents of which are incorporated by reference in their entirety.

FIELD

The present invention relates to external combustion engines. More particularly, the invention relates to an external combustion engine, such as a Stirling cycle engine and improved means for sealing pressure vessels associated therewith.

BACKGROUND

The Stirling cycle engine was originally conceived during the early portion of the nineteenth century by Robert Stirling. During the middle of the nineteenth century, commercial applications of this hot gas engine were devised to provide rotary power to mills. The Stirling engine was ignored thereafter until the middle of the twentieth century because of the success and popularity of the internal combustion engine. Stirling cycle machines, including engines and refrigerators, are described in detail in Walker, Stirling Engines, Oxford University Press (1980), incorporated herein by reference.

The principle underlying the Stirling cycle engine is the mechanical realization of the Stirling thermodynamic cycle: 1) isovolumetric heating of a gas within a cylinder, 2) isothermal expansion of the gas (during which work is performed by driving a piston), 3) isovolumetric cooling and 4) isothermal compression. Additional background regarding aspects of Stirling cycle machines and improvements thereto are discussed in Hargreaves, The Phillips Stirling Engine (Elsevier, Amsterdam, 1991), incorporated herein by reference. As such, an ideal Stirling cycle can be plotted in a pressure volume (PV) diagram as a pair of isothermal expansion-compression curves connected by a pair of constant volume heating and cooling lines. In actual engines, however, such an ideal cycle has never been achieved due to a dependent interaction between the displacer piston and the power piston of the engine.

The high theoretical efficiency of the Stirling engine has attracted considerable interest in recent years. The Stirling engine adds the additional advantages of easy control of combustion emissions, potential use of safer, cheaper, and more readily available fuels and quiet running operation, all of which combine to make the Stirling engine a highly desirable alternative to the internal combustion engine for many applications.

Despite these advantages, development of the Stirling engine has proceeded at a much slower rate than might otherwise be expected. Since the Stirling engine is an external combustion engine that includes a working gas sealed in a pressurized chamber, one of the more acute problems includes the need to seal the working gas at a high pressure within the working space.

In operation, a displacer body is movable within the chamber but occupies only a portion of the chamber volume so that as the displacer body is moved towards the cold end of the chamber the fluid is displaced towards the remaining volume at the hot end of the chamber. Cooling of the fluid is achieved by opposite movement of the displacer body towards the hot end, thus forcing the fluid towards the cool end of the chamber. In this manner the fluid is subjected to a thermodynamic cycle responsive to movement of the displacer body.

The hot end of the chamber is externally heated by any means desired or available, including gas burners, solar heaters, etc. The cold end of the fluid chamber may be water or air cooled, among other possible refrigeration schemes. The pressurized fluid is allowed to exert force against and reciprocate a working piston from which a useful work output may be derived through mechanical shaft arrangements or the like.

An ideal Stirling cycle can be plotted in a pressure volume (PV) diagram by a pair of isothermal expansion-compression curves connected by a pair of constant volume heating and cooling lines. In practical engines, however, such an ideal cycle has never been achieved due to a dependent interaction between the displacer piston and the power piston of the engine.

Stirling engines have been proposed for use in a wide range of applications. Examples include automotive applications, refrigeration systems and applications in outer space. The need to power portable electronics equipment, communications gear, medical devices and other equipment in remote field service presents yet another opportunity, as these applications require power sources that provide both high power and energy density, while also requiring minimal size and weight, low emissions and cost. One design, which is well suited, is the free-piston Stirling engine. The free-piston Stirling engine uses a displacer that is mechanically independent of the power output member. Its motion and phasing relative to the power output member is accomplished by the state of a balanced dynamic system of springs and masses, rather than a mechanical linkage.

To date, batteries have been the principal means for supplying portable sources of power. However, the time required for recharging batteries has proven inconvenient for continuous use applications. Moreover, portable batteries are generally limited to power production in the range of several milliwatts to a few watts and thus cannot address the need for significant levels of mobile, lightweight power production.

Small generators powered by internal combustion engines, whether gasoline- or diesel-fueled have also been used. However, the noise and emission characteristics of such generators have made them wholly unsuitable for a wide range of mobile power systems and unsafe for indoor use. While conventional heat engines powered by high energy density liquid fuels offer advantages with respect to size, thermodynamic scaling and cost considerations have tended to favor their use in larger power plants.

As indicated above, in Stirling engines, one end of the displacer cylinder is always hot; the other end is always relatively cold. While this design is beneficial from an efficiency standpoint, since repetitious heating and cooling of the same section of the displacer cylinder is avoided, the material requirements of the opposing ends of the displacer cylinder are markedly different. To address these divergent needs, the use of a two-piece piece pressure vessel, formed of dissimilar materials, have been considered. Since helium gas is often the preferred working fluid and the prevailing internal pressure of the pressure vessel is high, the effective sealing of such a pressure vessel has proven challenging.

In view thereof and despite the advances in the art, there continues to be a need for a pressure vessel of a Stirling engine, formed of dissimilar materials, having improved sealing characteristics.

SUMMARY

Provided is a pressure vessel for containing a mechanical device operable to convert heat to mechanical or electrical power. The pressure vessel includes a high temperature section, the high temperature section having a first end and an open second end; a sealing flange, the sealing flange having a first end and a second threaded end, the first end bonded to the open second end of the high temperature section, and a low temperature section having an open threaded first end, the open first end in sealing engagement with the second threaded end of the sealing flange.

Also provided is a Stirling engine. The Stirling engine includes a pressure vessel having a high temperature section, the high temperature section having a first end and an open second end, a sealing flange, the sealing flange having a first end and a second threaded end, the first end bonded to the open second end of the high temperature section, and a low temperature section having an open threaded first end, the open first end in sealing engagement with the second threaded end of the sealing flange, a displacer cylinder formed within the pressure vessel, the displacer cylinder having a high temperature end and a low temperature end, and a displacer for traversing the displacer cylinder from the high temperature end to a low temperature end.

Additionally provided is a method of hermetically sealing a pressure vessel of a Stirling engine. The pressure vessel has a high temperature section, the high temperature section having a first end and an open second end, and a low temperature section having an open threaded first end. The method includes the steps of providing a sealing flange, the sealing flange having a first end and a second threaded end, bonding the first end of the sealing flange to the open second end of the high temperature section, coating an outer surface of the open threaded first end of the low temperature section uniformly with solder, coating an inner surface of the second threaded end of the sealing flange uniformly with solder, and heating the second threaded end of the sealing flange until the solder coatings are uniformly melted and co-mingled, wherein upon cooling the solder layers re-solidify so as to form a leak-proof hermetic seal.

BRIEF DESCRIPTION OF THE DRAWINGS

The invention will now be described in more detail with reference to preferred forms of the invention, given only by way of example, and with reference to the accompanying drawings, in which.

DETAILED DESCRIPTION

Reference is now made to the embodiments illustrated in FIGS. 1–3B wherein like numerals are used to designate like parts throughout.

The Stirling engine is an external combustion engine, employing an external continuous combustion system for heating. Generally, this continuous combustion system is comprised of an induction system, an exhaust and a combustion chamber. In operation, a displacer is disposed within a displacer cylinder, one end of which is heated by the external combustion system. The displacer cylinder exists within what may be best characterized as a pressure vessel and contains a working fluid, which is often helium gas. When the displacer is positioned within the heated end of the displacer cylinder, the working fluid moves to the opposite, cooler end and exists at a lower temperature and pressure. When the displacer is moved into the cold end of the displacer cylinder, the working fluid moves around the displacer and into the hot end of the displacer cylinder, raising the temperature and pressure of the working fluid.

As may be appreciated, one end of the displacer cylinder is always hot; the other end is always cooler. This design is beneficial from an efficiency standpoint, since repetitious heating and cooling of the same section of the displacer cylinder is avoided. However, the material requirements of the opposing ends of the displacer cylinder are markedly different. To address these divergent needs, the use of a two-piece piece pressure vessel, formed of dissimilar materials, may be advantageously employed. Since helium gas is often the preferred working fluid and the prevailing internal pressure of the pressure vessel is high, the effective sealing of such a pressure vessel has proven challenging. As will be described below, the threaded sealing flange of the present invention addresses this challenge, providing an effective mechanism for sealing dissimilar materials.

Figure 1:
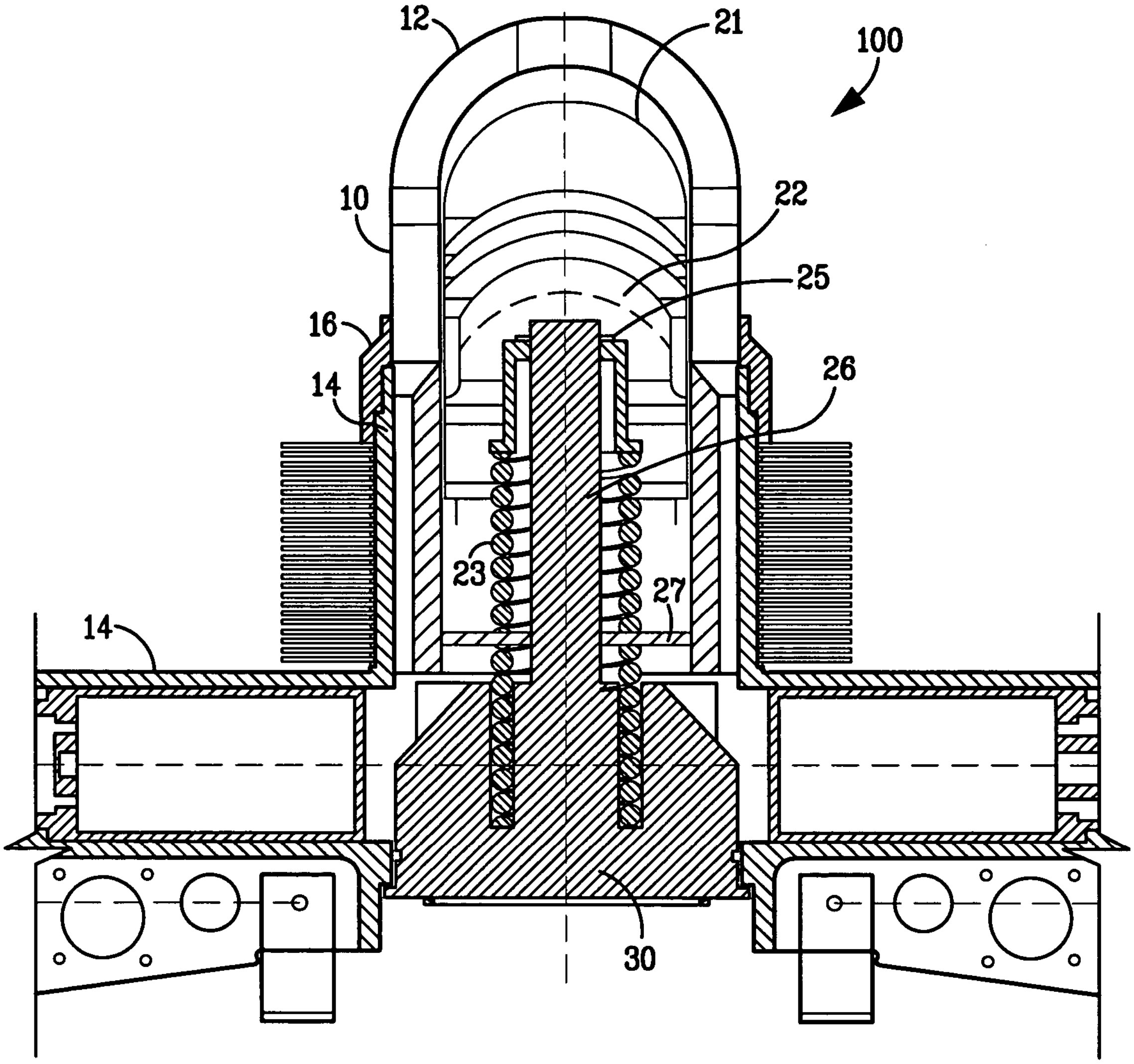
FIG. 1 presents a cross-sectional view of a Stirling engine 100, with its combustor/recuperator assembly removed, employing a threaded sealing flange of the present invention.

FIG. 1 presents a cross-sectional view of a Stirling engine 100, with its combustor/recuperator assembly removed, employing the threaded sealing flange of the present invention. A suitable combustor/recuperator 50 is shown in partial cross-section in FIG. 2 and is disclosed in Provisional Application Ser. No. 60/484,508, filed on Jul. 2, 2003, contents of which are incorporated by reference in their entirety.

Stirling engine 100 has a pressure vessel 10 which includes a high temperature section 12 and a low temperature section 14. High temperature section 12 is constructed of a material selected to withstand the high temperature environment created by its close proximity to combustor/recuperator assembly 50 (see FIG. 2), such materials including thin wall stainless steels and high nickel alloys, commonly known as superalloys. Other factors to consider in material selection include the need for safety, long life, low mass and excellent oxidation resistance at high temperature. While stainless steel has utility in this application, the superalloys are preferred as they possess superior strength at high temperature, excellent fatigue resistance and oxidation resistance when compared with the stainless steels.

The pressure vessel contains helium at very high pressures and temperatures, which vary cyclically in both high and low frequency modes. Low cycle fatigue has been found to be a critical issue, such fatigue associated with the number of engine start-ups and shut-downs. In selecting a material for use in high temperature section 12, cost, mass, life and performance trade-offs must be assessed. For examples, the less costly stainless steels can yield equivalent safety and life characteristics as a superalloy if the pressure vessel walls are made thicker and the operating temperatures maintained at lower levels, however, lower engine efficiency and power output are realized. What matters is strength, creep and oxidation resistance at high temperature.

As indicated, preferred materials include the superalloys, such as Inconel 600 (able to withstand a maximum temperature of 800° C.), Inconel 625 (able to withstand a maximum temperature of 900° C.), Inconel 718 (able to withstand a maximum temperature of more than 1000° C.), Inconel 754 (able to withstand a maximum temperature of 1800° C.) and Hastelloy GMR 235 (able to withstand a maximum temperature of 935° C.), with Inconel 718 being particularly preferred. High temperature section 12 may be fabricated from by deep drawing, hydro-forming, machining or casting, as those skilled in the art will recognize.

In selecting a material for use in forming low temperature section 14, the desire for low mass, thermal growth compatibility with the reciprocating components, and high thermal conductivity makes aluminum alloy an excellent choice for the cold end pressure vessel where operating temperatures permit its use. As is well-known, aluminum is roughly one-third the density of a superalloy, but much weaker. This creates the need for making the pressure vessel walls much thicker, although the structure is still significantly lighter. Another benefit that accrues through the use of aluminum in forming low temperature section 14 is the matching of the thermal coefficients of expansion between the piston and displacer and their bores so that seizing does not occur when the Stirling engine undergoes thermal changes. Yet another reason for selecting aluminum is to more easily transfer heat through the low temperature section 14 wall to the external heat exchanger 32 when driving temperature differentials are low.

With regard to material selection for threaded sealing flange 16, it should be noted that the high temperature section 12 of the pressure vessel 10 is maintained at about 650° C. by the combustor/recuperator assembly 50. The low temperature end of pressure vessel 10 is maintained at about 100° C. by an external heat exchanger 32. Within the engine, the entire temperature differential (650° C.–100° C.) is taken along the length of the regenerator heat exchanger. It is preferred that the positioning of the joint between the high temperature section 12 and the low temperature section 14 be selected at about the level of the cold end of the regenerator since this is a natural break point in the Stirling engine and the bulk of the temperature gradient can be taken along the superalloy high temperature section 12 wall. It is desirable to take the bulk of the temperature gradient along the superalloy high temperature section 12 wall, rather than along the aluminum low temperature section 14 wall since the higher strength and creep resistance of the superalloy allows it to survive the combined pressure induced loads and those associated with the thermal gradients. Additionally, the conduction losses are reduced due to the lower conductivity and required cross-sectional area of the superalloy wall and any heat conducted from the hot to the cold end of the engine represents an efficiency penalty.

In view of the aforementioned factors, threaded sealing flange 16 may be constructed from the stainless steels and superalloys, including Inconel 600, Inconel 625, Inconel 718, Inconel 754 and Hastelloy GMR 235, with Inconel 718 being particularly preferred. As will be described in more detail below, a hermetic seal is provided between high temperature section 12 and a low temperature section 14 through the use of threaded sealing flange 16. As will be discussed further below, threaded sealing flange 16 may be brazed or welded to high temperature section 12 of pressure vessel 10. The assembly of threaded sealing flange 16 and high temperature section 12 of pressure vessel 10 may alternatively be machined or cast as a single component.

Referring still to FIG. 1, within pressure vessel 10 of Stirling engine 100 is a displacer assembly 22 mounted to a displacer rod 26. Displacer rod 26 is attached to the engine casing 30. Displacer assembly 22 consists of a displacer seal body 27, a displacer cap assembly 21 and a spring 23. The spring 23 is attached to the displacer seal body 27 with mounting screws (not shown), and to the displacer rod 26 with a mounting ring 25. During displacer reciprocation, one end of spring 23 remains fixed in place via the mounting screws while spring 23 is free to expand and contract in direct relationship with the movement of displacer 22. While it is important that spring 23 be free to expand and contract in direct relationship with the movement of displacer 22, the above disclosed mechanism for attaching spring 23 to displacer rod 26 is only one of many possible ways of providing attachment. Moreover, displacer 22 and spring 23 are designed such that the moving mass and the force constant of spring 23 provide a combination which is mechanically resonant at a desired frequency.

Figure 2:
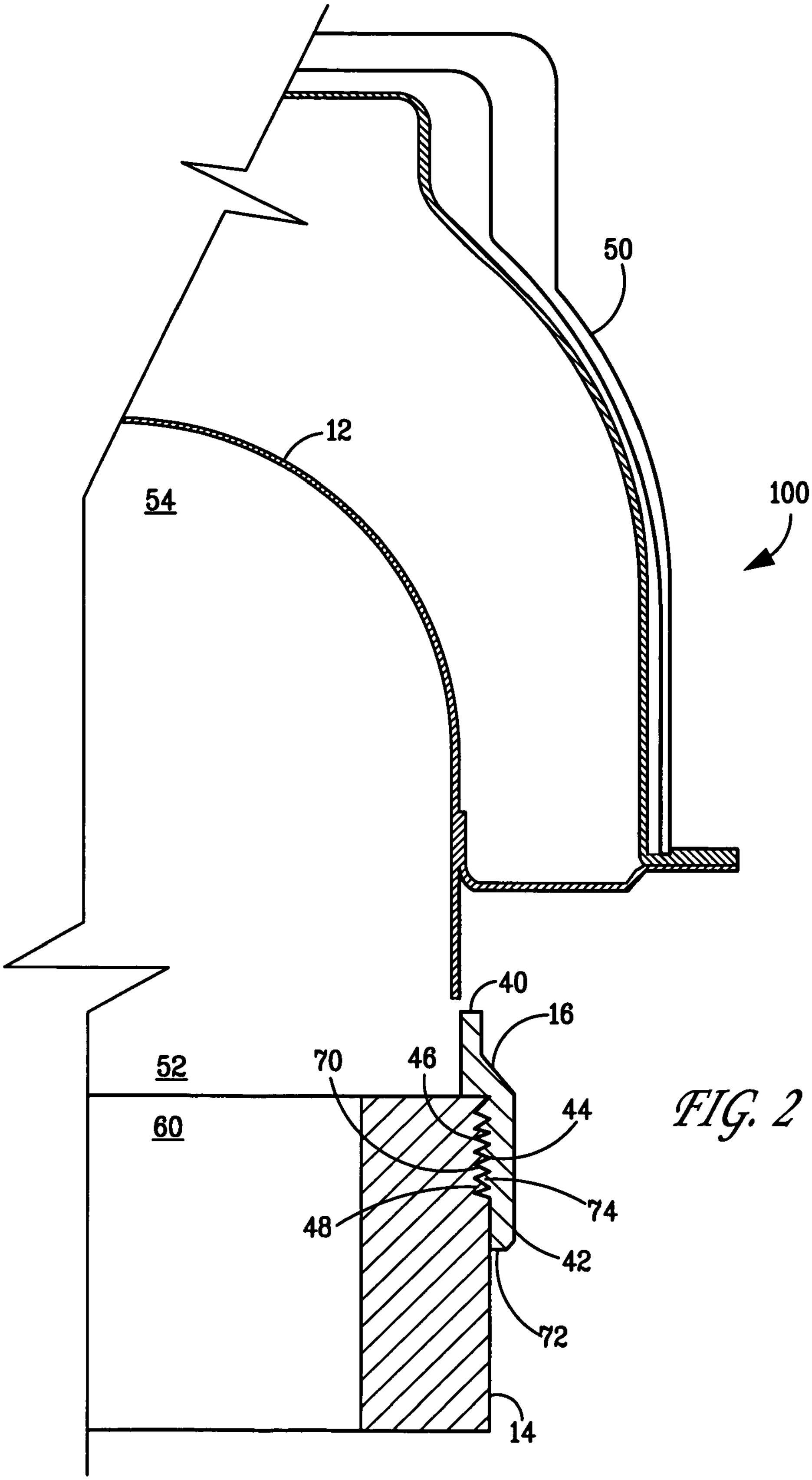
FIG. 2 shows a combustor/recuperator in partial cross-section, together with a partial cross-sectional view of a threaded sealing flange, in accordance with an embodiment of the invention.
Figure 3A:
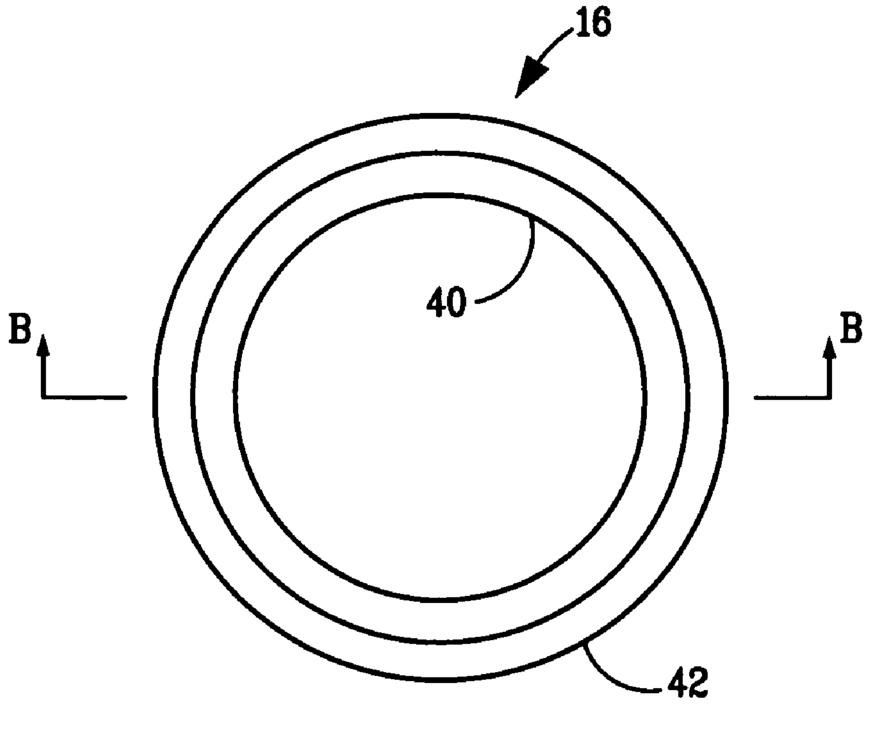
FIG. 3A presents a top plan view of a form of a threaded sealing flange, in accordance with an embodiment of the invention.
Figure 3B:
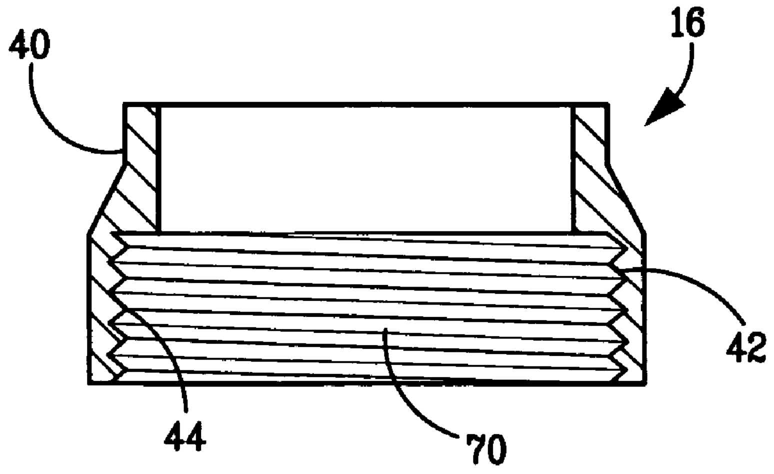
FIG. 3B presents a cross-sectional view of a threaded sealing flange, taken along line B—B of FIG. 3A, in accordance with an embodiment of the invention.

Referring now to FIGS. 2, 3A and 3B, enlarged views of one form of the threaded sealing flange 16 are shown. Threaded sealing flange 16 has a first end 40 and a second threaded end 42. The first end 40 may be left unthreaded for bonding to the open end 52 of high temperature section 12. Bonding may be accomplished by welding or braising, as those skilled in the art will recognize. Second threaded end 42 is provided with a thread 44 on an inner surface thereof. It is preferred that a machine thread, rather than a pipe thread, be employed to assure proper sealing engagement with low temperature section 14. A 2 MM machined thread has been found to be particularly effective.

As shown in FIG. 2, low temperature section 14 has an open threaded first end 60, which is provided with a thread 48 on an outer surface thereof. It is preferred that a machine thread, rather than a pipe thread, be employed to assure proper sealing engagement with the threaded sealing flange 16. Once again, a 2 MM machined thread has been found to be particularly effective.

As may be appreciated by those skilled in the art, the harsh environment sought to be sealed makes it desirable to effect a hermetic seal without the use of conventional sealing materials such as O-rings and the like. As such, the threads themselves must seal the joint. To assure hermetic sealing, thread 44 may be uniformly coating with solder 70 before assembly. To address the issue of flowing a solder coating on thread 48 of open threaded first end 60 of low temperature section 14 when low temperature section 14 is formed from aluminum, thread 48 is first electroplated with a layer 72 of copper, nickel or electroless nickel, with electroless nickel being preferred. Following the application of layer 72, a uniform coating of solder 74 is applied before assembly. Alternatively, cavities for solder pre-forms may be machined into either the threaded sealing flange 16 or the open threaded first end 60 of low temperature section 14 of pressure vessel 10.

To assemble the joint, first end 40 of threaded sealing flange 16 is braised to open second end 52 of high temperature section 12. Second threaded end 42 of sealing flange 16 is threaded onto open threaded first end 60 of low temperature section 14 until fully seated thereon. Heat is applied about second threaded end 42 of sealing flange 16 until solder coatings 70 and 74 are uniformly melted and co-mingled. The joint is allowed to cool until the solder layers re-solidify, forming a leak-proof hermetic seal.

The threaded flange provides a simple method for joining the hot and cold ends of the Stirling engine pressure vessel, allowing for the mechanical coupling of dissimilar materials. Advantageously, the threads carry the mechanical loads associated with pressurization and thermal gradients. As may be appreciated by those skilled in the art, the joint is configured such that the thermal growth of the components generates hoop stresses in the threaded flange, and compressive stresses in the aluminum. Moreover, the joint is configured such that the axial loads align with the threads, to the extent possible, to reduce bending moments.

In operation of Stirling engine 100, heat is be supplied to the heater head at between approximately 500° C. and 750° C. To maximize efficiency, highly preheated combustion air should be used. To accomplish this, the air is preheated in the recuperator of combustor recuperator assembly 50 (see FIG. 2). For maximum combustor efficiency, high-quality heat, that is the heat directly available from combustion, is transferred directly to the engine heater head, while the lower quality heat, that is the heat of the exhaust stream, is used to preheat the combustion air in the recuperator.

As is preferred, the combustor may be fueled using a source of gaseous fuel or may be fitted with a fuel system capable of providing a vaporized high energy density liquid fuel for combustion. Suitable fuels that exist as gases at standard temperatures and pressures (ambient conditions) include such hydrocarbon fuels as methane, ethane, propane and butane. Alternatively, a fuel vaporizer suitable for use in the present invention is disclosed in U.S. application Ser. No. 10/143,463, the contents of which are incorporated by reference in their entirety.

While the invention has been described in detail with reference to preferred embodiments thereof, it will be apparent to one skilled in the art that various changes can be made, and equivalents employed, without departing from the scope of the invention.

What is claimed is:

1. A method of hermetically sealing a pressure vessel of a Stirling engine, the pressure vessel having a high temperature section, the high temperature section having a first end and an open second end, and a low temperature section having an open threaded first end, the method comprising the steps of:

a) providing a sealing flange, the sealing flange having a first end and a second threaded end;

b) bonding the first end of the sealing flange to the open second end of the high temperature section;

c) coating an outer surface of the open threaded first end of the low temperature section uniformly with solder;

d) coating an Inner surface of the second threaded end of the sealing flange uniformly with solder; and e) heating the second threaded end of the sealing flange until the solder coatings are uniformly melted and co-mingled, wherein upon cooling the solder layers re-solidify so as to form a leak-proof hermetic seal.

2. The method of claim 1, wherein the sealing flange is constructed of a material selected from the group consisting of thin wall stainless steel, Inconel 600, Inconel 625, Inconel 718, Inconel 754 and Hastelloy GMR 235.

3. The method of claim 2, wherein the low temperature section is constructed of aluminum alloy.

4. The method of claim 1, wherein the low temperature section is cast aluminum alloy.

5. The method of claim 4, wherein an outer surface of the open threaded first end of the low temperature section is clad with a layer of material selected from the group consisting of copper, nickel and electroless nickel.

6. The method of claim 1, wherein the high temperature section is constructed of a material selected from the group consisting of thin wall stainless steel and high nickel alloys.

7. The method of claim 6, wherein the high temperature section is constructed of a material selected from the group consisting of thin wall stainless steel, Inconel 600, Inconel 625, Inconel 718, Inconel 754 and Hastelloy GMR 235.

8. The method of claim 6, wherein the sealing flange is constructed of a material selected from the group consisting of thin wall stainless steel and high nickel alloys.

* * * * *